US009497171B2

(12) United States Patent
Khosravi et al.

(10) Patent No.: US 9,497,171 B2
(45) Date of Patent: Nov. 15, 2016

(54) METHOD, DEVICE, AND SYSTEM FOR SECURELY SHARING MEDIA CONTENT FROM A SOURCE DEVICE

(75) Inventors: Hormuzd Khosravi, Portland, OR (US); Sachin Agrawal, Hillsboro, OR (US);
(Continued)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,406

(22) PCT Filed: Dec. 15, 2011

(86) PCT No.: PCT/US2011/065094
§ 371 (c)(1),
(2), (4) Date: Jun. 24, 2013

(87) PCT Pub. No.: WO2013/089728
PCT Pub. Date: Jun. 20, 2013

(65) Prior Publication Data
US 2013/0297936 A1 Nov. 7, 2013

(51) Int. Cl.
*H04L 29/06* (2006.01)
*G06F 21/10* (2013.01)
(Continued)

(52) U.S. Cl.
CPC ........... *H04L 63/0428* (2013.01); *G06F 21/10* (2013.01); *G06F 21/72* (2013.01); *H04L 9/0822* (2013.01);
(Continued)

(58) Field of Classification Search
CPC .................. G11B 20/00086; H04L 2209/603; H04L 9/0891; H04L 9/3268; H04L
(Continued)

(56) References Cited

U.S. PATENT DOCUMENTS 5,657,390 A    8/1997   Elgamal
6,324,288 B1   11/2001   Hoffman
(Continued)

FOREIGN PATENT DOCUMENTS

TW        201340692 A    10/2013
WO       2011119985        9/2011
(Continued)

OTHER PUBLICATIONS

Applicant Admitted Prior Art, Intel Corp., Information Disclosure Statement Sep. 19, 2013, Non-Patent Literature Documents, Item 3, Product Brief: Intel Atom Processor CE4100, 2009, p. 1-4.*
(Continued)

*Primary Examiner* — Joseph P Hirl
*Assistant Examiner* — Stephen Gundry
(74) *Attorney, Agent, or Firm* — Barnes & Thornburg LLP (57) ABSTRACT

A method, device, and system for sharing media content with a sink device includes performing a cryptographic key exchange with the sink device and generating an authorization key in a security engine of a system-on-a-chip (SOC) of a source device. The method may also include generating an exchange key as a function of the authorization key and a packet key as a function of the exchange key. Such key generation occurs in the security engine of the SOC, and the keys are stored in a secure memory of the security engine.

24 Claims, 5 Drawing Sheets

(75) Inventors: Anirudh Venkataramanan, Hillsboro, OR (US)

(51) Int. Cl.
*G06F 21/72* (2013.01)
*H04L 9/08* (2006.01)

(52) U.S. Cl.
CPC ............ *H04L 9/0841* (2013.01); *H04L 9/0869* (2013.01); *H04L 63/0435* (2013.01); *H04L 63/061* (2013.01); *H04L 2209/60* (2013.01); *H04L 2463/101* (2013.01)

(58) Field of Classification Search
CPC ............ 63/0428;H04L 63/061; H04L 9/0822; H04L 9/0869; H04L 2209/60; H04L 63/0435; H04L 2463/101; H04L 9/0841; G06F 21/10; G06F 21/72; G06F 2221/2107
See application file for complete search history.

(56) References Cited

U.S. PATENT DOCUMENTS

| | | | |
|---|---|---|---|
| 6,401,208 B2 | 6/2002 | Davis | |
| 6,948,065 B2 | 9/2005 | Grawrock | |
| 7,069,352 B2 | 6/2006 | Pezzini | |
| 7,096,352 B2 | 8/2006 | Kang | |
| 7,305,711 B2* | 12/2007 | Ellison | G11B 20/00086 713/193 |
| 7,350,083 B2* | 3/2008 | Wells | G06F 21/72 380/46 |
| 7,600,132 B1 | 10/2009 | Mahmoud | |
| 7,747,862 B2 | 6/2010 | Ovadia | |
| 7,802,085 B2 | 9/2010 | Graunke | |
| 7,813,822 B1 | 10/2010 | Hoffberg | |
| 7,966,646 B2 | 6/2011 | Chou | |
| 8,014,530 B2 | 9/2011 | Brickell | |
| 8,205,238 B2 | 6/2012 | Blumenthal et al. | |
| 8,295,484 B2 | 10/2012 | Buer et al. | |
| 8,615,787 B2 | 12/2013 | Murray | |
| 8,627,440 B2 | 1/2014 | Mowers | |
| 8,645,677 B2 | 2/2014 | Khosravi et al. | |
| 8,856,515 B2* | 10/2014 | Khosravi | H04L 9/0825 380/277 |
| 9,342,666 B2* | 5/2016 | Khosravi | G06F 21/10 |
| 2002/0112161 A1 | 8/2002 | Thomas | |
| 2002/0163522 A1 | 11/2002 | Porter et al. | |
| 2003/0236970 A1 | 12/2003 | Palmer | |
| 2004/0170068 A1* | 9/2004 | Williams | G06F 21/88 365/200 |
| 2004/0243823 A1 | 12/2004 | Moyer et al. | |
| 2005/0005093 A1 | 1/2005 | Bartels | |
| 2005/0021941 A1* | 1/2005 | Ohmori | G11B 20/00086 713/156 |
| 2005/0114687 A1 | 5/2005 | Zimmer et al. | |
| 2005/0144436 A1 | 6/2005 | Chen | |
| 2005/0213768 A1 | 9/2005 | Durham et al. | |
| 2005/0289343 A1 | 12/2005 | Tahan | |
| 2006/0005011 A1 | 1/2006 | Satoh | |
| 2006/0015947 A1* | 1/2006 | Conti | G06F 12/1433 726/34 |
| 2006/0036853 A1* | 2/2006 | Chen | G06F 21/64 713/161 |
| 2006/0041938 A1 | 2/2006 | Ali | |
| 2006/0133604 A1 | 6/2006 | Buer et al. | |
| 2006/0236117 A1* | 10/2006 | Lazaridis | G06K 7/01 713/185 |
| 2007/0138229 A1 | 6/2007 | Fujimoto | |
| 2007/0156987 A1 | 7/2007 | Chen | |
| 2007/0192611 A1 | 8/2007 | Datta | |
| 2007/0209072 A1* | 9/2007 | Chen | G06F 21/10 726/16 |
| 2007/0240200 A1 | 10/2007 | Han | |
| 2008/0005586 A1 | 1/2008 | Munguia | |
| 2008/0022395 A1 | 1/2008 | Holtzman et al. | |
| 2008/0037793 A1 | 2/2008 | Buer | |
| 2008/0077809 A1* | 3/2008 | Hayler et al. | 713/193 |
| 2008/0086641 A1* | 4/2008 | Rodgers | H04L 9/0891 713/176 |
| 2008/0098212 A1* | 4/2008 | Helms | H04L 63/0428 713/155 |
| 2008/0148061 A1 | 6/2008 | Jin et al. | |
| 2008/0177998 A1 | 7/2008 | Apsangi et al. | |
| 2008/0229104 A1 | 9/2008 | Ju et al. | |
| 2008/0244267 A1 | 10/2008 | Zimmer | |
| 2008/0256363 A1 | 10/2008 | Balacheff | |
| 2009/0019551 A1* | 1/2009 | Haga | G06F 21/57 726/27 |
| 2009/0280905 A1 | 11/2009 | Weisman | |
| 2009/0319804 A1 | 12/2009 | Qi | |
| 2010/0042839 A1 | 2/2010 | Ho | |
| 2010/0150340 A1* | 6/2010 | Choi | G06F 7/725 380/28 |
| 2010/0205443 A1 | 8/2010 | Zhao | |
| 2010/0299525 A1 | 11/2010 | Shah et al. | |
| 2011/0023077 A1 | 1/2011 | Simon | |
| 2011/0154023 A1 | 6/2011 | Smith | |
| 2011/0154061 A1 | 6/2011 | Chilukuri et al. | |
| 2011/0161645 A1* | 6/2011 | Zhang et al. | 713/2 |
| 2011/0231923 A1 | 9/2011 | Bollay | |
| 2011/0235806 A1 | 9/2011 | Fukuda | |
| 2012/0008780 A1* | 1/2012 | Al-Somani | G06F 7/725 380/255 |
| 2012/0042170 A1* | 2/2012 | Curtin | G06F 21/77 713/185 |
| 2012/0079287 A1* | 3/2012 | Leclercq | G06F 21/575 713/192 |
| 2012/0137137 A1 | 5/2012 | Brickell et al. | |
| 2012/0173877 A1* | 7/2012 | Pendakur | G06F 21/123 713/169 |
| 2012/0288086 A1* | 11/2012 | Schaffer | G06F 7/724 380/28 |
| 2012/0290849 A1* | 11/2012 | Simske | H04L 9/3247 713/189 |
| 2012/0328096 A1* | 12/2012 | Shah | H04L 9/3271 380/33 |
| 2013/0019105 A1* | 1/2013 | Hussain | G06F 21/10 713/189 |
| 2013/0080764 A1 | 3/2013 | Khosravi et al. | |
| 2013/0091362 A1* | 4/2013 | Poeluev | H04L 9/0841 713/179 |
| 2013/0218937 A1* | 8/2013 | Naito | H04L 9/3066 708/208 |
| 2013/0275769 A1 | 10/2013 | Khosravi et al. | |
| 2013/0297936 A1 | 11/2013 | Khosravi | |
| 2014/0129827 A1 | 5/2014 | Khosravi et al. | |
| 2014/0270166 A1 | 9/2014 | Avanzi | |

FOREIGN PATENT DOCUMENTS

| | | |
|---|---|---|
| WO | 2013089725 A1 | 6/2013 |
| WO | 2013089726 A1 | 6/2013 |
| WO | 2013089728 A1 | 6/2013 |
| WO | 2014074127 A1 | 5/2014 |

OTHER PUBLICATIONS

Digital Transmission License Administrator, Digital Transmission Content Protection Specification, Mar. 19, 2010, vol. 1, p. 11, 26-29, and 36-38.*

Broadcom, Aug. 24, 2011, What is BCM7309—Single-Chip Back-End Set-Top Decoder, http://web.archive.org/web/20110824145230/http://www.broadcom.com/products/Cable/Cable-Set-Top-Box-Solutions/BCM7309.*

International Preliminary Report on Patentability received for PCT International Application No. PCT/US2011/065094, mailed Jun. 26, 2014, 7 pages.

International Search Report and Written Opinion received for International Application No. PCT/US2011/065094, mailed Aug. 27, 2012, 10 pages.

(56) References Cited

OTHER PUBLICATIONS

Bajikar, "Trusted Platform Module (TPM) based Security on Notebook PCs," White Paper, Jun. 20, 2002, 20 pages.
Intel Corp., "Product Brief: Intel® Atom™ Processor CE4100," 2009, 4 pages.
"Transport Layer Security," Wikipedia, The Free Encyclopedia, available: [http://en.wikipedia.org/w/index.php?title=Transport_Layer_Security&oldid=464220022], edited Dec. 5, 2011, 19 pages.
"Diffie-Hellman key exchange," Wikipedia, The Free Encyclopedia, available: <hhttp://en.wikipedia.org/w/index.php?title=Diffie%E2%80%93Hellman_key_exchange&oldid=464229141>, accessed Dec. 8, 2011, 9 pages.
"Elliptic curve cryptography," Wikipedia, The Free Encyclopedia, available: <http://en.wikipedia.org/w/index.php?title=Elliptic_curve_cryptography&oldid=464634149>, accessed Dec. 8, 2011, 8 pages.
"Scrambler," Wikipedia, The Free Encyclopedia, available: <http://en.wikipedia.org/w/index.php?title=Scrambler&oldid=460036487>, accessed Dec. 8, 2011, 4 pages.
"HTTP Secure," Wikipedia, The Free Encyclopedia, available: [http://en.wikipedia.org/w/index.php?title=HTTP_Secure&oldid=465003157], edited Dec. 9, 2011, 6 pages.
U.S. Appl. No. 13/694,221, filed Nov. 8, 2012, 50 pages.
Taiwanese Office Action issued in connection with Taiwanese Application No. 101147203, completed Dec. 29, 2014, 11 pages.
International Preliminary Report on Patentability received for PCT International Application No. PCT/US2011/065072, mailed Jun. 26, 2014, 6 pages.
International Search Report and Written Opinion received for International Application No. PCT/US2011/065072, Mailed Jul. 18, 2012, 10 Pages.
Platform Independent Overall Security architecture in multi-processor system-on-chip intergrated circuits for use in mobile phones and handheld devices. Ashkenazi et al. ElSevier (2007).
Data Security Architure using Embedded Chip. Thomas et al. IJCSNS (May 2011).
Scalable Architectural Support for Trusted Software. Champagne et al. IEEE (2009).
Secure Memory Accesses on Networks-on Chip. Fiorin et al. IEEE (2009).
European Search Report for Patent Application No. 11877504.8-1853/2791856, dated Jul. 16, 2015, 8 pages.
Hitachi, Ltd., "Digital Transmission Content Protection Specification Revision 1.7," Dec. 14, 2011, Retrieved from the Internet: URL: http://www.dtcp.com/documents/dtcp/info-20111214-dtcp-v1-rev-1-p-7.pdf (retrieved on Jul. 21, 2014), Chapter 4: Full Authentication and Chapter 6: Content Channel Management and Protection.
Chinese Office Action for Application No. 201180076380.1, dated Mar. 14, 2016, 9 pages.

\* cited by examiner

METHOD, DEVICE, AND SYSTEM FOR SECURELY SHARING MEDIA CONTENT FROM A SOURCE DEVICE

BACKGROUND

The generation, sharing, and consumption of digital media content continue to grow as consumer devices capable of interacting with such content become ubiquitous. The desire to share digital media content between consumer devices, especially in the home environment, is increasing in unison with the increased exposure to digital media content. To ensure that two media devices can properly share digital media content while also ensuring the digital rights of such content remain protected, digital media content delivery protocols have been developed by various authority organizations. One such organization is the Digital Living Network Alliance (DLNA), which has established various interoperability protocols and standards for sharing media content between media devices. For example the Digital Transmission Content Protection (DTCP) protocol is a security protocol that defines security guidelines and compliance requirements for securely sharing media content between media devices. Digital Transmission Content Protection over Internet Protocol (DTCP-IP) is a sub-set protocol of the DTCP protocol directed to sharing media content between media devices over a network.

Some media devices utilize system-on-a-chip (SOC) designs due to their relatively small footprint. SOC devices are integrated circuits that incorporate various components, in addition to the processing core, of electronic systems on a single die. For example, an SOC may include a processor core, memory controller, video components, audio components, and/or communication components on a single chip.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects or links between components and/or one or more point-to-point interconnects between components. Embodiments of the invention may also be implemented as instructions carried by or stored on a machine-readable medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Figure 1:
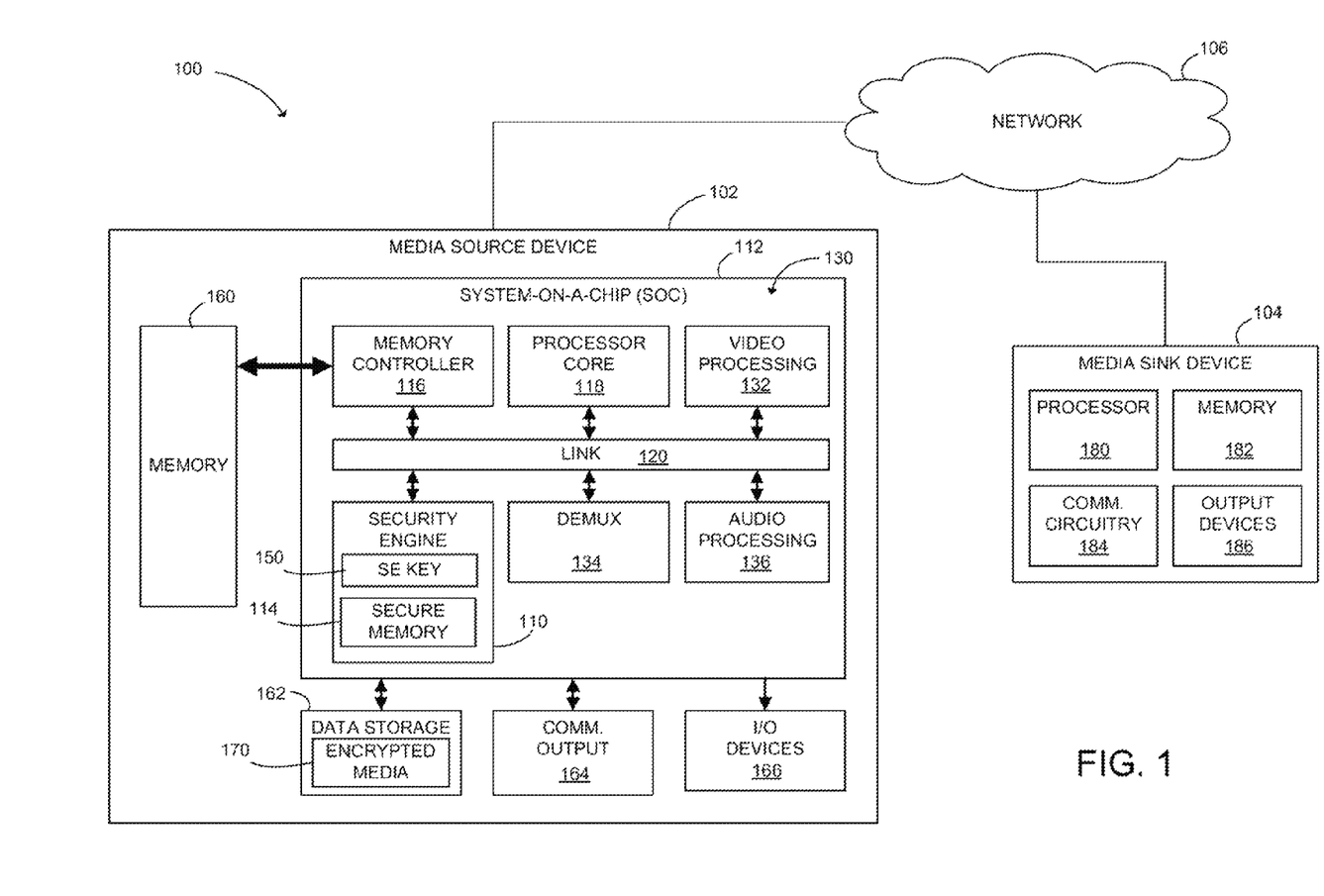
FIG. 1 is a simplified block diagram of at least one embodiment of a system for sharing media content from a media source device having a system-on-a-chip (SOC) to a media sink device.

Referring now to FIG. 1, a system 100 for sharing digital media content includes a media source device 102, a media sink device 104, and a network 106. In operation, the media source device 102 may share digital media content with the media sink device 104 over the network 106 using a security protocol. In the illustrative embodiment, a Digital Transmission Content Protection (DTCP) security protocol is used, such as the Digital Transmission Content Protection over Internet Protocol (DTCP-IP). However, other security protocols may be used in other embodiments.

The media source device 102 initially authenticates the media sink device 104. If the media sink device 104 is successfully authenticated, the media source device 102 and sink device 104 perform a key exchange to generate a shared secret key. The media source device 102 generates a packet encryption key based on the shared key and encrypts the media content using the packet encryption key. The media sink device 104 may decrypt the media content using a shared exchange key. To ensure the security and protection of the media content, the keys and other cryptographic functions generated by the media source device 102 are done so within a security engine 110 of a system-on-a chip (SOC) 112 of the media source device 102. The media source device 102 maintains the keys in secrecy within a secure memory 114 of the security engine 110. In this way, digital media content may be shared with the media sink device 104 while ensuring the security of the digital media content and the encryption keys used to facilitate such secured sharing.

The media source device 102 may be embodied as any type of device capable of delivering digital media content to the media sink device 104. For example, the media source device 102 may be embodied as a set-top box, a digital television, a smartphone, a tablet computer, a laptop computer, a mobile internet device (MID), a desktop computer, or other device capable of delivery of media content. The media source device 102 may be configured to deliver any type of digital media content to the media sink device 104 including, for example, movies, pictures, images, songs, audio and/or video recordings, and/or any other type of audio, video, and/or audio and video content.

As discussed above, the media source device 102 includes the SOC 112, which may be embodied as any type of system-on-a-chip device having various components and structures. In the illustrative embodiment of FIG. 1, the SOC 112 includes the security engine 110, a memory controller 116, a processor core 118, and bus a plurality of hardware peripherals 130, which are communicatively coupled to each other a link 120. The link 120 may be embodied as any type of interconnect such as a bus, point-to-point, or other interconnect capable of facilitating communication between the various components of the SOC 122. The hardware peripherals 130 may include any type of hardware peripheral component depending upon the intended functionality of the SOC 112. For example, in the illustrative embodiment, the hardware peripherals 130 include a demux 132 to separate audio and video content streams, video processing component(s) 134 to process video content, and audio processing component(s) 136 to process audio content. Of course, it should be appreciated that the hardware peripherals 130 of the SOC 112 have been simplified in the illustrative embodiment of FIG. 1 and that the SOC 112 may include additional, different, and/or greater detailed hardware peripherals 130, which are not illustrated in FIG. 1 for clarity of the disclosure.

The security engine 110 may be embodied as a security co-processor or processing circuitry separate from the processor core 118. The security engine 110 includes a security key 150 and the secure memory 114, which is accessible only by the security engine 110. The security engine 110 stores the security key 150, and other cryptographic keys as discussed below, in the secure memory 114. In the illustrative embodiment, the security key 150 is provisioned during the manufacturing of the SOC 112, but may be generated by the SOC 112 during operation in other embodiments. For example, in some embodiments, the security key 150 is based on blown fuses within the security engine 110 itself. Additionally or alternatively, the security engine 110 may include a key-generating module, such as a trusted platform module (TPM), to generate the security key 150. During use, the security engine 110 may use any number of security keys 150, which may be identical or different from each other.

In some embodiments, the media source device 102 may include additional components and structures other than the SOC 112 depending on the type and intended use of the media source device 102. For example, in the illustrative embodiment of FIG. 1, the media source device 102 includes a system memory 160, a data storage 162, a communications output 164, and one or more input/output devices 166. The system memory 160 may be embodied as any type of main memory or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices.

The data storage 162 may be embodied as any type of device or devices configured for the short-term or long-term storage of data such as, for example, memory devices and circuits, memory cards, hard disk drives, solid-state drives, or other data storage devices. In the illustrative embodiment of FIG. 1, encrypted media content 170 may be stored in the data storage 162, which may be subsequently shared with the media sink device 104 as discussed below.

The communications output 164 may be embodied as a simplified output or as various circuits and/or devices to facilitate, for example, communications with the media sink device 104. For example, the communications output 164 (and/or communication circuitry within the SOC 112) may any suitable communication protocol such as Ethernet (i.e. the IEEE 802.3 standard) or Wi-Fi® (i.e., the IEEE 802.11 standard), and/or other communication protocols or standards.

The input/output devices 166 may be embodied as any type of I/O device for interacting with the media source device 102. For example, the I/O devices 166 may include output devices such as a display for displaying media on the media source device 102 and speakers for playing audio content, and/or input devices such as a remote control receiver, a keyboard, a mouse, and/or the like.

The media sink device 104 may be embodied as any type of media device capable of communicating with and receiving media content from the media source device 102. For example, the media sink device 104 may be embodied as a digital television, a smartphone, a tablet computer, a laptop computer, a mobile internet device (MID), a desktop computer, or other electronic device capable of receiving of media content from the media source device 102.

The illustrative media sink device 104 includes a processor 180, a memory 182, communication circuitry 184, and one or more output devices 186, which may be similar to such components found in other media devices. For example, the processor 180 may be embodied as any type of processor capable of executing software/firmware, such as a microprocessor, digital signal processor, microcontroller, or the like, and may include one or more processing cores. The memory 182 may be embodied as any type of memory or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices.

The communication circuitry 184 may be embodied any type of circuitry and/or device to facilitate, for example, communications with the media source device 102. For example, the communication circuitry 184 may support communication protocols such as Ethernet (i.e. the IEEE 802.3 standard) or Wi-Fi® (i.e., the IEEE 802.11 standard), and/or other communication protocols or standards. The output devices 186 may be embodied as any type of output device for playing, rendering, or otherwise delivering the media content to a user. For example, the output devices 186 may include a display for displaying media on the media sink device 104 and speakers for playing audio content.

The network 106 may be embodied as any number of various wired and/or wireless networks, in the illustrative embodiment, the network 106 is a local area network (LAN) such as a home network, but may be embodied as or otherwise include other networks in other embodiments. For example, in some embodiments, the network 106 may be embodied as an ad-hoc or point-to-point network or a wide area network (WAN). As discussed in more detail below, the media source device 102 is configured to share media content with the media sink device 104 over the network 106.

Figure 2:
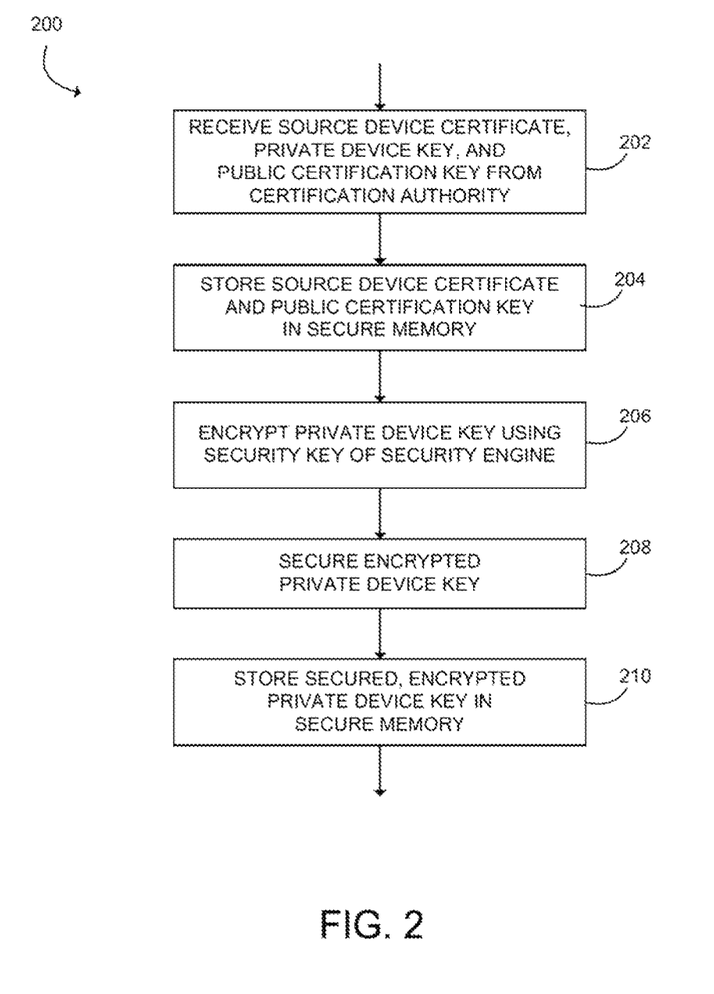
FIG. 2 is a simplified flow diagram of at least one embodiment of a method for provisioning a security engine of the SOC of the media source device.

Referring now to FIG. 2, in use, the security engine 110 of the SOC 112 of the media source device 102 may be provisioned with key material for facilitating the delivery of media content to various sink devices. To do so, the media source device 102 may execute a method 200 for provisioning the security engine 110. The method 200 begins with block 202 in which the security engine 110 receives a source device certificate, a private device key, and a public certification key. The source device certificate, the private device key, and the public certification key are typically generated by a certification authority organization, which acts as a third-party verifier of the authentication of the particular device. The source device certificate includes a unique device identifier or number assigned to the media source device 102 by the certification authority organization to verify the media source device 102 to other media devices. The unique device identifier may also be used to revoke the authorization of the media source device 102 via distribution of a System Renewability Message (SRM) revocation list. The private device key may be used by the media source device 102 to sign the packets so as to authenticate the media source device 102 to other media devices as discussed in more detail below. Conversely, the public certification key may be used by the media sink device 104 to verify the packets received form the media source device 102 during authentication.

In block 204, the security engine 110 stores the source device certificate and the public certification key in the secure memory 114. In some embodiments, the security engine 110 may encrypt the source device certificate and/or the public certification key using the security key 150 stored in the security engine 110. In such embodiments, the security engine 110 may store the encrypted source device certificate and/or the encrypted public certification key in the secure memory 114, in the memory 160, or in the data storage 162.

In block 206, the security engine 110 encrypts the private device key using the security key 150 stored in the security engine 110. In some embodiments, the security engine 110 may also secure the encrypted private device key in block 208. To do so, for example, the security engine may perform a Cipher Block Chaining Message Authentication Code (CBC MAC) on the encrypted private device key. Alternatively, the security engine 110 may use some other cryptographic methodology to secure the encrypted private device key. Regardless, in block 210, the security engine 110 stores the secured, encrypted private device key in the secure memory 114. In this way, the security engine 110 of the SOC 112 of the media source device 102 is provisioned with initial key material to facilitate delivering media to sink devices in a secure manner.

Figure 3A:
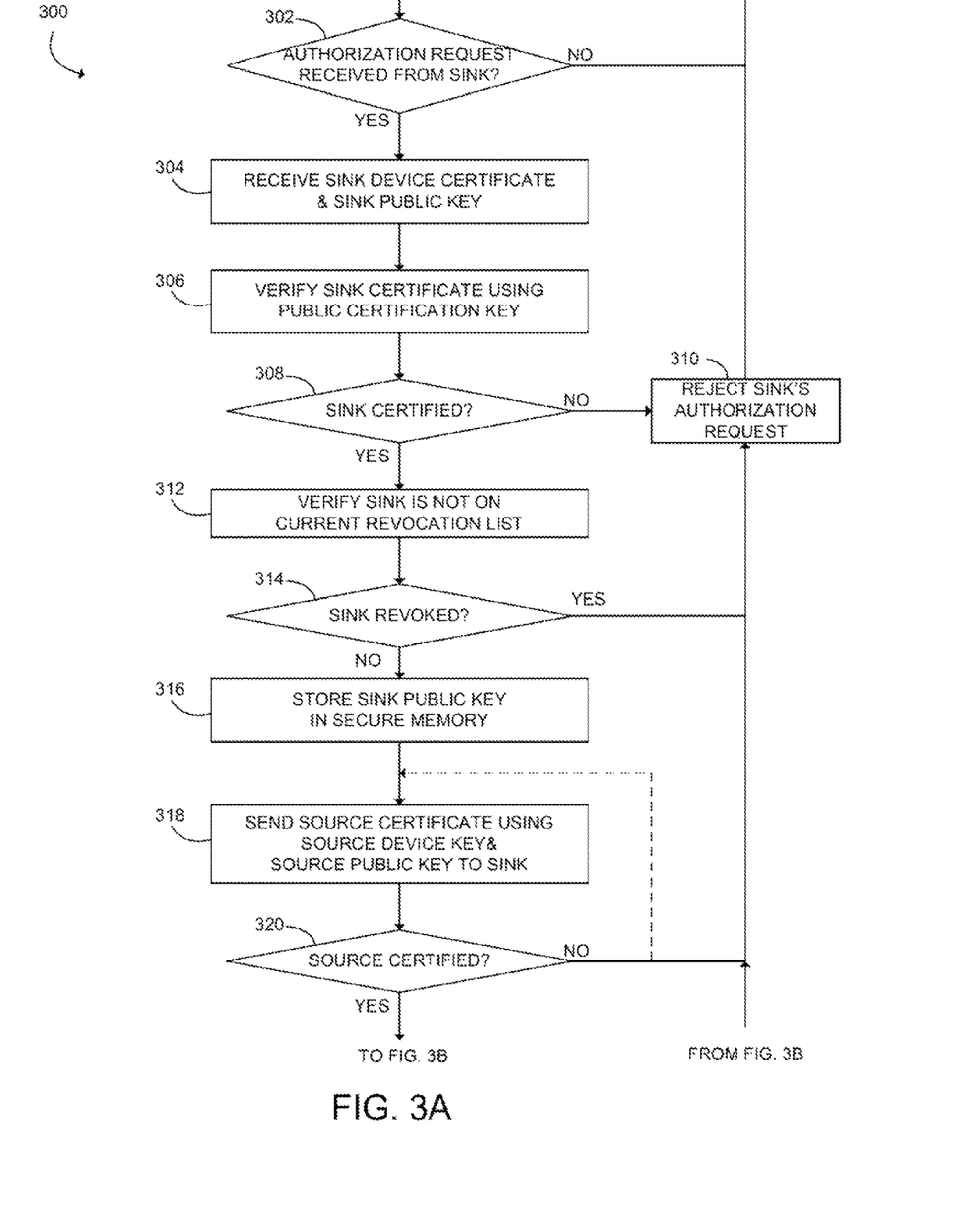
FIG. 3 is a simplified flow diagram of at least one embodiment of a method for authenticating the media sink device of FIG. 1.

Referring now to FIG. 3, the media source device 102 may use a Digital Transmission Content Protection (DTCP) protocol to share media content with the sink device 104 as discussed above. Prior to the actual sharing of media content with the media sink device 104, the media source device 102 is configured to authenticate the media sink device 104 and negotiate cryptographic keys with the media sink device 104 to facilitate the delivery of media content thereto. To do so, the media source device 102 may execute a method 300 for authenticating the media sink device 104. The method 300 begins with block 302 in which the media source device 102 determines whether a request for authorization has been received from the media sink device 104. If so, in block 304, the media source device 102 receives the sink device certificate and sink public cryptographic key. Similar to the source device certificate of the media source device 102, the sink device certificate is issued by the certification authority organization to verify the media sink device 104. The sink device certificate includes a unique device identifier assigned by the certification authority organization, which uniquely identifies the media sink device 104 from other media devices. The sink public key may be used by the security engine 110 in subsequent communications to verify that received messages were originated by the media sink device 104.

In block 306, the media source device 102 verifies the sink device certificate using the public certification key. In embodiments in which the public certification key is stored in an encrypted form, the security engine 110 of the SOC 112 of the media source device 102 retrieves the encrypted public certification key and decrypts the key using the security key 150. The public certification key is used to verify that the sink device certificate has been properly signed by an authorized media device. As such, in block 308, the media source device 102 determines whether the media sink device 104 is properly certified using the public certification key. If not, the method 300 advances to block 310 in which the media source device 102 rejects the authorization request from the media sink device 104.

However, if the sink device certificate is verified in block 308, the media source device 102 further verifies that the certification of the media sink device 104 has not been revoked. To do so, the media source device 102 may utilize an SRM list, which includes identifiers of devices whose certification has been previously revoked. The SRM list of the media source device 102 may be stored in the secure memory 114 of the SOC 112 in some embodiments. Alternately, the SRM list may be stored in the memory 160 or the data storage 162 in an encrypted or unencrypted form. As new devices are added to the local network of media devices, the SRM list is updated on each device. As such, in block 312, the media source device 102 compares the unique device identifier of the media sink device 104, which was received with the sink device certification, against the current SRM list. If, in block 314, the certification of the media sink device 104 is determined to have been revoked, the method 300 advances to block 310 in which the media source device 102 rejects the authorization request from the media sink device 104.

If, however, the certification of the media sink device is not revoked, the method 300 advances to block 316 in which the security engine 110 of the SOC 112 stores the sink public key in the secure memory 114 of the security engine 110. In block 318, the security engine 110 attic SOC 112 retrieves the source device certificate and private source key from the secure memory 114. Additionally, in block 318, the media source device 102 may retrieve a source public key and a source certificate and send the key and certificate to the media sink device 104. The source public key may be used by the media sink device 104 in subsequent communications to verify that received messages were originated by the media source device 102.

If the media source device is not verified in block 320, the method 300 advances to block 310 in which the media source device 102 rejects the authorization request from the media sink device 104. Alternatively, in some embodiments, the media source device 102 may attempt to resend the source certificate and source public key to the media sink device 104.

However, if the source certificate is verified in block 320, the method 300 advances to block 322 (see FIG. 3B) in which the media source device 102 and the media sink device 104 perform a key exchange. The key exchange is used to establish a shared secret key in the media source device 102 and the media sink device 104 without prior provisioning of the devices 102, 104 with corresponding keys. The media source device 102 may use any appropriate key exchange algorithm to effect the establishment of a shared secret.

Figure 3B:
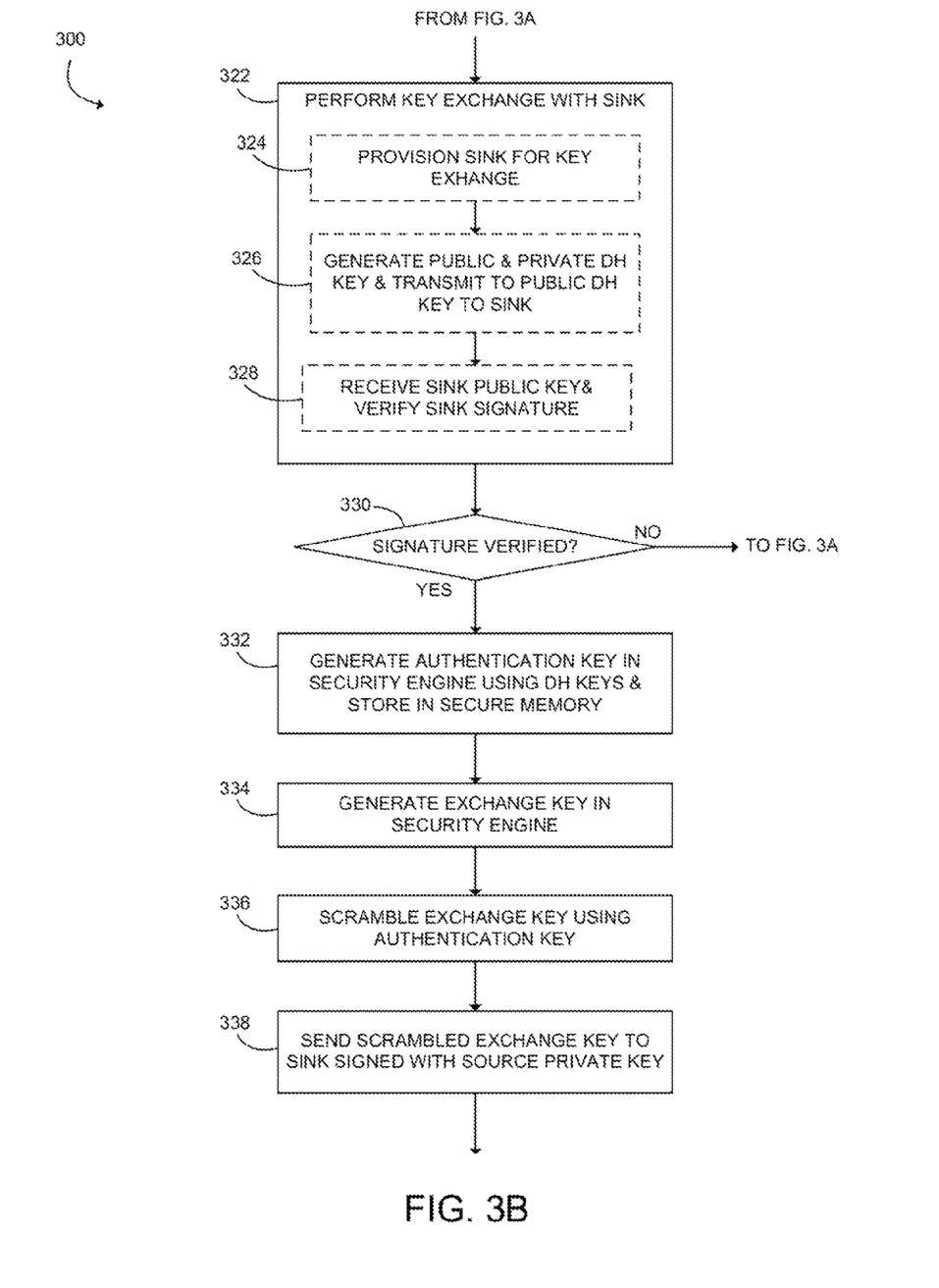

In the illustrative embodiment, the media source device 102 uses an elliptic curve Diffie-Hellman (ECDH) key exchange in block 322. To do so, the media source device 102 provisions the media sink device 104 for the Diffie-Hellman key exchange in block 324. For example, media source device 102 may select the elliptic curve, E, and the base point, G, to be used in generating the shared secret. The domain parameters associated with the elliptic curve and base point selections are sent to the media sink device 104 in block 324. Of course, in other embodiments, other Diffie-Hellman key exchanges may be used such as, for example, Rivest-Shamir-Adleman (RSA) Diffie-Hellman key exchange. In such embodiments, the media source device 102 generates the domain parameters (e.g., selects a prime number and a primitive root) and transmits the domain parameters to the media sink device 104 in block 324.

The security engine 110 of the SOC 112 of the media source device 102 may sign the transmission of block 324, and other subsequent transmissions, with the private source key corresponding to the public source key provided to the media sink device 104 in block 318. In some embodiments, the private source key may be the security key 150 or other key stored in the secure memory 114 of the security engine 110.

In block 326, the security engine 110 of the SOC 112 generates a source Diffie-Hellman public and private key based on the domain parameters generated or otherwise determined in block 324. The media source device 102 sends the public Diffie-Hellman key to the media sink device 104 in block 326. Again, such transmission may be signed by the security engine using the private source key (e.g., security key 150).

In block 328, the media source device 102 receives the sink Diffie-Hellman public key from the media sink device 104, which may be calculated in a similar manner as described above in regard to the media source device 102. The media source device 102 stores the sink Diffie-Hellman public key in the secure memory 114 of the security engine 110. Additionally, in block 328, the media source device 102 verifies the signature of the sink Diffie-Hellman public key message, and other subsequent messages received from the media sink device 104, using the sink public key stored in the secure memory 114. If the media source device 102 determines that the message, or other message, is not properly signed, the method 300 advances to block 310 in which the media source device 102 rejects the authorization request from the media sink device 104.

In block 332, the security engine 110 of the SOC 112 of generates an authentication key, $K_{AUTH}$, using the source Diffie-Hellman private key and the sink Diffie-Hellman public key. The security engine 110 may store the authentication key, $K_{AUTH}$, the secure memory 114. In the illustrative embodiment, for example, the security engine 110 performs an elliptic curve scalar multiplication using the source Diffie-Hellman private key and the sink Diffie-Hellman public to generate the authentication key, $K_{AUTH}$. Of course, other cryptographic calculations may be performed in block 332 in other embodiments to generate the authentication key, $K_{AUTH}$. However, any such calculations occur in the security engine 110 to maintain the security of the authentication process.

In block 334, the security engine 110 generates an exchange key, $K_X$. In the illustrative embodiments, the exchange key, $K_X$, is embodied as a random nonce, but may be generated using other methodologies or calculations in other embodiments. The nonce is a random or pseudorandom number intended to be used only once in cryptographic functions to thwart, for example, replay attacked.

In block 336, the security engine 110 of the SOC 112 scrambles the exchange key, $K_X$, using the authentication key, $K_{AUTH}$. The security engine 110 may use any suitable cryptographic calculation or scrambling algorithm/methodology to scramble the exchange key, $K_X$. Subsequently, in block 338, the media source device 102 sends the scrambled exchange key to the media sink device 104. Again, as discussed above, such message may be signed by the security engine 110 of the SOC 112 using the private device key (e.g., the security key 150). The media sink device 104 may generate the exchange key, $K_X$, using the shared authentication key, $K_{AUTH}$. In this way, a shared secret key is established between the media source device 102 and the media sink device 104 using the security engine 110 of the SOC 112 of the media source device 102.

Figure 4:
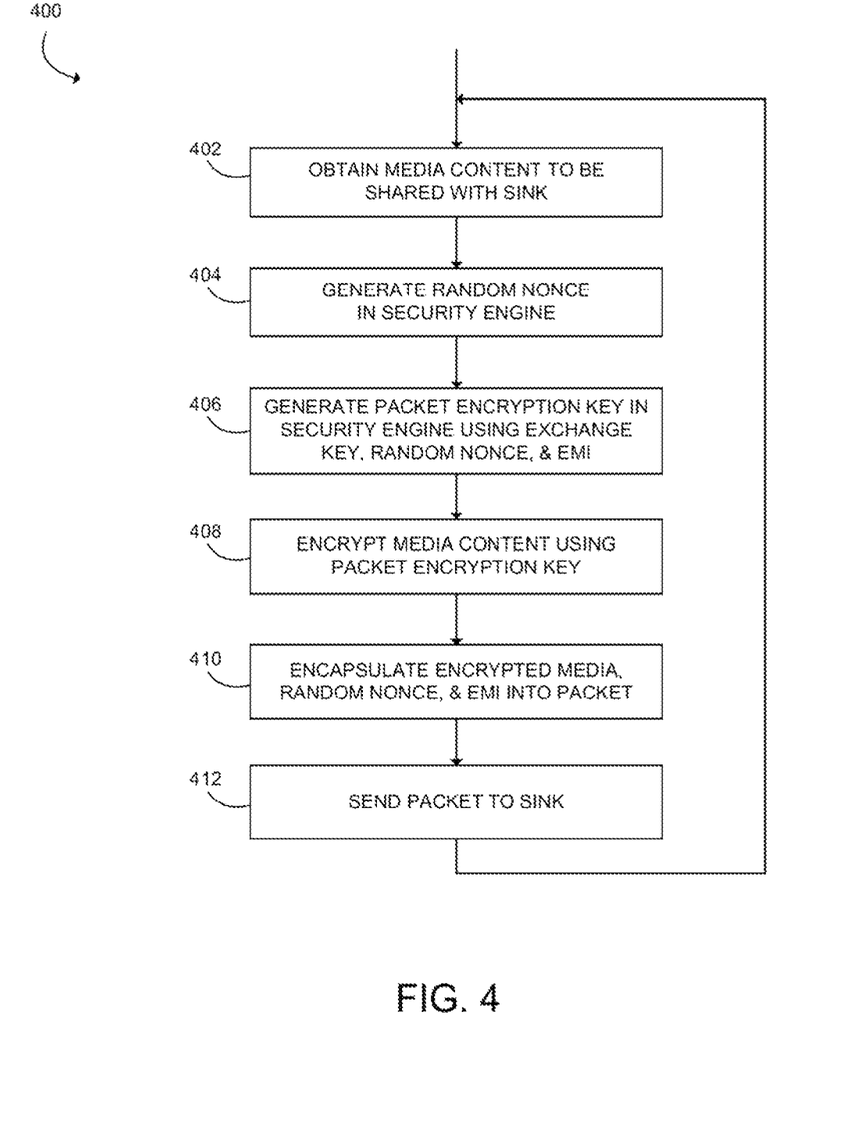
FIG. 4 is a simplified flow diagram of at least one embodiment of a method for securely sharing media content with the media sink device of FIG. 1.

After the media source device 102 and the media sink device 104 have established the shared secret key via the method 300, the media source device 102 may share media content with the media sink device 104 using the shared secret key. To do so, the media source device 102 may execute a method 400 for sharing media content with the media sink device 104 as shown in FIG. 4. The method 400 begins with block 402 in which the media source device 102 obtains media content to be shared with the media sink device 104. Such media content may be stored in the media source device 102 as encrypted media content 170 or may be received by the media source device 102 from an external source (e.g., streamed or transmitted to the media source device 102 such as digital cable TV).

In block 404, the security engine 110 of the media source device 102 generates a random nonce, which is used to combat replay attacks. In block 406, the security engine 110 generates a packet encryption key, $K_C$, using the exchange key, $K_X$, the random nonce generated in block 404, and an encryption mode indicator (EMI), which is used for copy control of media content, in the illustrative embodiment, the security engine 110 utilizes an Advanced Encryption Standard-Cipher Block Chaining (AES-CBC) algorithm to generate the packet encryption key, $K_X$. However, other encryption algorithms may be used in other embodiments. It should be appreciated that a new packet encryption key, $K_C$, is generated in the security engine for each packet of media content sent to the media sink device 104.

In block 408, the security engine 110 encrypts the media content, or a portion thereof, to be sent to the media sink device 104 using the packet encryption key, $K_C$. Of course, if the media content is stored on the media source device 102 in an encrypted format (which would be encrypted using an encryption key other than the packet encryption key, $K_C$), the media source device 102 decrypts the media content before re-encrypting the media content with the packet encryption key, $K_C$.

In block 410, the media source device 102 encapsulates the encrypted media content, the random nonce generated in block 404, and the EMI into a Protected Content Packet (PCP) packet. Of course, other encapsulation methodologies may be used in other embodiments. Subsequently, in block 412, the media source device 102 sends the encapsulated packet to the media sink device 104. It should be appreciated that the media source device 102 may send multiple packets to the media sink device 104 to effect the secure delivery of the media content to the media sink device 104. The media sink device 104 may decrypt the media content using the exchange key, $K_X$, as discussed above.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A system-on-a-chip apparatus comprising:
   a system-on-a-chip comprising a security engine having a secure memory accessible only by the security engine, wherein the security engine comprises a security key that is stored based on blown fuses within the security engine, the security engine to:
   encrypt a private key with use of the security key;
   receive a request for authorization from a sink device;
   decrypt the private key with use of the security key in response to receipt of the request for authorization;
   perform a cryptographic key exchange with the sink device with use of the private key;
   generate an authorization key as a function of the cryptographic key exchange;
   generate an exchange key using the authorization key;
   store the authorization key and the exchange key in the secure memory;
   generate a random number;
   obtain media content to share with the sink device;
   generate a packet encryption key as a function of the exchange key and the random number; and
   encrypt the media content using the packet encryption key to share the encrypted media content with the sink device using a transmission security protocol.

2. The system-on-a-chip apparatus of claim 1, wherein the security engine to perform a Diffie-Hellman cryptographic key exchange with the sink device to generate the authorization key.

3. The system-on-a-chip apparatus of claim 2, wherein the Diffie-Hellman cryptographic key exchange is an elliptic curve Diffie-Hellman cryptographic key exchange.

4. The system-on-a-chip apparatus of claim 3, wherein the security engine to:
   generate a source Diffie-Hellman public key and a source Diffie-Hellman private key;
   receive a sink Diffie-Hellman public key from the sink device; and
   perform an elliptic curve scalar multiplication as a function of the source Diffie-Hellman private key and the sink Diffie-Hellman public key.

5. The system-on-a-chip apparatus of claim 1, wherein the exchange key is a scrambled exchange key and the security engine is to generate a first exchange key and generate the scrambled exchange key using the first exchange key and the authorization key.

6. The system-on-a-chip apparatus of claim 1, wherein the security engine to:
   encapsulate the encrypted content media, the random number, and an encryption mode indicator.

7. The system-on-a-chip apparatus of claim 1, wherein the security engine to receive a certificate from the sink device, retrieve a public certification key from the secure memory, and verify the certificate received from the sink device using the public certification key.

8. The system-on-a-chip apparatus of claim 7, wherein the security engine to receive a sink public key from the sink device and store the sink public key in the secured memory, the sink public key to authenticate communications received from the sink device.

9. The system-on-a-chip apparatus of claim 1, wherein the security key is stored in the security engine at the time of manufacture of the system-on-a-chip apparatus.

10. One or more non-transitory, machine-readable storage media comprising a plurality of instructions stored thereon that, in response to execution by a system-on-a-chip, cause the system-on-a-chip to:
   encrypt a private key with use of a security key, wherein the security key is stored in a secure memory of a security engine of the system-on-a-chip accessible only by the security engine, wherein the security key is stored based on blown fuses within the security engine;
   receive a request for authorization from a sink device;
   decrypt the private key with use of the security key in response to receipt of the request for authorization;
   perform a cryptographic key exchange with the sink device with use of the private key;
   generate an authorization key in the security engine of the system-on-a-chip as a function of the cryptographic key exchange;
   generate an exchange key in the security engine of the system-on-a-chip based on the authorization key;
   store the authorization key and the exchange key in the secure memory of the security engine of the system-on-a-chip;
   generate a random number;
   obtain media content to share with the sink device;
   generate a packet encryption key as a function of the exchange key and the random number; and
   encrypt the media content using the packet encryption key to share the encrypted media content with the sink device using a transmission security protocol.

11. The one or more non-transitory, machine-readable storage media of claim 10, wherein to perform a cryptographic key exchange comprises to perform a Diffie-Hellman cryptographic key exchange with the sink device.

12. The one or more non-transitory, machine-readable storage media of claim 11, wherein to perform the Diffie-Hellman cryptographic key exchange comprises to perform an elliptic curve Diffie-Hellman cryptographic key exchange.

13. The one or more non-transitory, machine-readable storage media of claim 12, wherein to perform the Diffie-Hellman cryptographic key exchange comprises to (i) generate a source Diffie-Hellman public key and a source Diffie-Hellman private key in the security engine of the system-on-a-chip and (ii) receive a sink Diffie-Hellman public key from the sink device; and
   wherein to generate the authorization key comprises to perform an elliptic curve scalar multiplication in the security engine of the system-on-a-chip as a function of the source Diffie-Hellman private key and the sink Diffie-Hellman public key.

14. The one or more non-transitory, machine-readable storage media of claim 10, wherein the exchange key is a scrambled exchange key and to generate the exchange key in the security engine comprises to:
   generate a first exchange key in the security engine, and
   generate the scrambled exchange key in the security engine of the system-on-a-chip based on the first exchange key and the authorization key.

15. The one or more non-transitory, machine-readable storage media of claim 14, wherein to generate an exchange key comprises to generate a random number in the security engine of the system-on-a-chip.

16. The one or more non-transitory, machine-readable storage media of claim 10,
   wherein the plurality of instructions further cause the system-on-a-chip to:
   encapsulate the encrypted content media, the random number, and an encryption mode indicator in the security engine of the system-on-a-chip; and
   transmit the encapsulated packet to the sink device.

17. The one or more non-transitory, machine-readable storage media of claim 10, wherein the plurality of instructions further cause the system-on-a-chip to:
   receive a certificate from the sink device;
   retrieve a public certification key from the secure memory of the security engine of the system-on-a-chip; and
   verify the certificate received from the sink device using the public certification key.

18. The one or more non-transitory, machine-readable storage media of claim 17, wherein the plurality of instructions further cause the system-on-a-chip to:
   receive a sink public key from the sink device; and
   store the sink public key in the secured memory of the security engine of the system-on-a-chip, the sink public key to authenticate communications received from the sink device.

19. The one or more non-transitory, machine-readable storage media of claim 10, wherein the plurality of instructions further cause the system-on-a-chip to:
   receive a public certification key with the security engine of the system-on-a-chip; and
   store the public certification key in the secure memory of the security engine, the public certification key to verify certificates received from the sink device.

20. The one or more non-transitory, machine-readable storage media of claim 10, wherein the plurality of instructions further cause the system-on-a-chip to:
   generate a security key in the security engine of the system-on-a-chip; and
   store the security key in the secured memory of the security engine.

21. The one or more non-transitory, machine-readable storage media of claim 20, wherein the plurality of instructions further cause the system-on-a-chip to:
   receive a source private device key with the security engine of the system-on-a-chip;
   encrypt the source private device key using the security key;
   store the encrypted source private device key in the secure memory of the security engine of the system-on-a-chip; and
   generate a source certificate in the security engine of the system-on-a-chip using the source private device key.

22. The one or more non-transitory, machine-readable storage media of claim 10, wherein the security key in stored in the security engine at the time of manufacture of the system-on-a-chip.

23. A method comprising:
   storing a security key in a secure memory of a security engine of a system-on-a-chip at the time of manufacture of the system-on-a-chip based on blown fuses within the security engine, wherein the secure memory is accessible only by the security engine;
   encrypting a private key with use of the security key at the time of manufacture of the system-on-a-chip;
   receiving, by the system-on-a-chip, a request for authorization from a sink device;

decrypting, by the system-on-a-chip, the private key with use of the security key in response to receipt of the request for authorization;

performing, by the system-on-a-chip, a cryptographic key exchange with the sink device with use of the private key;

generating, by the system-on-a-chip, an authorization key in the security engine of the system-on-a-chip of the computing device as a function of the cryptographic key exchange;

storing, by the system-on-a-chip, the authorization key in a secure memory of the security engine of the system-on-a-chip;

generating, by the system-on-a-chip, an exchange key in the security engine of the system-on-a-chip based on the authorization key;

generating, by the system-on-a-chip, a random number;

obtaining media content to share with the sink device;

generating, by the system-on-a-chip, a packet encryption key as a function of the exchange key and the random number;

storing, by the system-on-a-chip, the exchange key in the secure memory of the security engine of the system-on-a-chip;

encrypting, by the system-on-a-chip and with the packet encryption key, the media content; and transmitting, by the system-on-a-chip, the media content to the sink device.

24. The method of claim 23, further comprising encapsulating, by the system-on-a-chip, the encrypted content media, the random number, and an encryption mode indicator.

* * * * *